(12) United States Patent
Suhara et al.

(10) Patent No.: US 9,475,238 B2
(45) Date of Patent: Oct. 25, 2016

(54) REPAIR METHOD OF REPAIR TARGET PORTION, AND REPAIRED PRODUCT OBTAINED FROM REPAIRING

(71) Applicant: MITSUBISHI AIRCRAFT CORPORATION, Aichi (JP)

(72) Inventors: Masayoshi Suhara, Tokyo (JP); Toshikazu Shigetomi, Tokyo (JP); Hideaki Tanaka, Tokyo (JP); Morimasa Ishida, Aichi (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 134 days.

(21) Appl. No.: 14/226,983

(22) Filed: Mar. 27, 2014

(65) Prior Publication Data

US 2014/0295124 A1    Oct. 2, 2014

(30) Foreign Application Priority Data

Mar. 28, 2013    (JP) .................................. 2013-69370

(51) Int. Cl.
*B29C 73/10*    (2006.01)
*B29C 73/12*    (2006.01)

(52) U.S. Cl.
CPC ............... *B29C 73/10* (2013.01); *B29C 73/12* (2013.01); *Y10T 428/20* (2015.01)

(58) Field of Classification Search
CPC .......... B29C 64/90; B29C 66/90; B64C 3/00
USPC ........................................ 156/94, 64; 428/63
See application file for complete search history.

(56) References Cited

U.S. PATENT DOCUMENTS 5,972,141 A * 10/1999 Ellyin ..................... B23P 6/04
156/71

FOREIGN PATENT DOCUMENTS

JP            10-156633 A      6/1998

* cited by examiner

*Primary Examiner* — Brent O'Hern
(74) *Attorney, Agent, or Firm* — Pearne & Gordon LLP

(57) ABSTRACT

The present invention relates to a repair method using a pre-cured repairing patch, and a repaired product obtained from repairing using the repairing patch, and the present invention securely bonds a repairing patch, where an out-of-plane stiffness is required, to a repair target. In order to cover a repair target portion 23 formed in an outer panel 2 with a repairing patch 30, and bond the repairing patch 30 to a repair target, repairing plates 31, 32 that are formed of fibers and thermosetting resin, and pre-cured before repairing are used as the repairing patch 30, and a laminating step S4 of laminating the repairing plates 31, 32, and a bonding step S7 of bonding the repairing plates 31, 32 to each other are performed.

15 Claims, 6 Drawing Sheets

REPAIR METHOD OF REPAIR TARGET PORTION, AND REPAIRED PRODUCT OBTAINED FROM REPAIRING

BACKGROUND OF THE INVENTION

1. Field of the Invention

The present invention relates to a method of repairing a repair target portion of an object damaged by receiving impact or the like by bonding a pre-cured repairing material to the repair target portion, and a product repaired using the repairing material.

2. Description of the Related Art

An outer panel (skin) forming an outer surface of a fuselage or a wing of an aircraft requires to be repaired if the outer panel is damaged by a lightning strike or flying objects such as hailstones. In this repairing, a composite material formed of fiber reinforced plastics (FRP) or the like is used as a repairing material for covering a repair target portion.

Such a composite material is produced by a method of laminating fibers, which is formed in a sheet form, and impregnated with a liquid resin, and curing the resin by heating (wet lay-up), or a method of laminating a half-cured intermediate material (prepreg), and curing this material by heating. A repairing patch heated and cured in advance (precured patch) is also used as the composite material.

Using a precured patch attains such advantages of securing stable quality of repairing, and facilitating storage of repairing materials.

In the case of using a precured patch, as described in Japanese Patent Laid-Open No. 10-156633, the precured patch is disposed on a surface of a repair target, and an adhesive disposed between the repair target and the precured patch is cured by heating so as to bond the precured patch to the repair target.

An outer panel of an aircraft is required to have a high smoothness in order to minimize drag in flight. Hence, the precured patch used in repairing of the outer panel is required to have an enough out-of-plane stiffness to withstand deformation and buckling if a great load is applied during flight so that the precured patch does not become deformed in the out-of-plane direction.

The out-of-plane stiffness denotes difficulty in deformation in the out-of-plane direction, and even involves shearing rigidity in which bending stiffness is dominant.

The precured patch is pre-cured in a predetermined thickness so as to satisfy a desired out-of-plane stiffness. This means that the precured patch already has an out-of-plane stiffness required during using a repaired product before repairing, and thus it is difficult to curve the precured patch along the surface of the repair target.

Consequently, even if the difference in shape between the precured patch and the repair target is small, a gap is generated between the precured patch and the repair target, which makes it difficult to bond the precured patch to the repair target. If the precured patch is forcibly pushed and bonded to the repair target, such force that peels off the precured patch 15 from the repair target 17 acts on the circumference of the precured patch 15 after the adhesive is cured, as shown in FIG. 6 (indicated by arrows), which significantly deteriorates the bonding strength.

Based on the above problems, the present invention relates to a repair method using a precured repairing patch, and a repaired product obtained from repairing using the repairing patch, and an object of the present invention is to securely bond a repairing patch, where an out-of-plane stiffness is required, to a repair target.

SUMMARY OF THE INVENTION

A repair method of the present invention is a repair method of a repair target portion, in which the repair target portion formed in a repair target is covered with a repairing patch, and the repairing patch is bonded to the repair target, the repair method using a plurality of repair plates that are formed of fibers and resin, and pre-cured before repairing as the repairing patch, and including: a laminating step of laminating the plurality of repairing plates; and a bonding step of bonding the plurality of repairing plates, laminated in the laminating step, to one another.

A predetermined out-of-plane stiffness is required in the repairing patch depending on the portion where the repair target portion exists. Based on this out-of-plane stiffness, a plate thickness required in the repairing patch is determined.

In the present invention, it is allowed to divide the plate thickness required in the repairing patch into a plurality of repairing plates that are used as the repairing patch, and thus a plate thickness of each repairing plate becomes thinner. These repairing plates are laminated in the laminating step, and bonded to one another in the bonding step, thereby attaining the out-of-plane stiffness required in the repairing patch.

According to the present invention, the repairing patch is flexible enough to be deformed in the out-of-plane direction with a smaller force until these repairing plates are bonded to one another, compared to the repairing patch whose repairing plates are integrated. Accordingly, the repairing patch is allowed to follow the surface of the repair target, thereby securely bonding the repairing patch to the repair target. Meanwhile, integral bonding of the plurality of repairing plates allows the repairing plate to have the out-of-plane stiffness corresponding to its total plate thickness.

According to the present invention, it is possible to securely repair the repair target portion while ensuring the out-of-plane stiffness required in the repairing patch.

The repairing patch used in the present invention is flexible until the plurality of repairing plates are bonded to one another; therefore, it is possible to repair the repair target portion regardless of the shape of the surroundings of the repair target portion.

According to the present invention, by changing the number of the repairing plates, it is possible to repair multiple different portions requiring different out-of-plane stiffness.

According to the present invention, it is unnecessary to prepare various precured patches corresponding to various shapes of different portions in the repair target. According to the present invention, for example, a plurality of repairing plates having several different plane sizes with a certain plate thickness are prepared, and are appropriately combined so as to satisfy the out-of-plane stiffness required in the repairing material depending on the portion to be repaired, thereby realizing a general use of the repairing material. Accordingly, reduction in cost can be attained.

In the repair method of the present invention, it is preferable that in the laminating step, on one of the repairing plates, another of the repairing plates having a greater size than that repairing plate is laminated.

In this configuration, the one of the repairing plates is entirely covered with another of the repairing plate, thereby protecting the one of the repairing plates from being peeled off from the repair target.

In the repair method of the present invention, it is preferable that the repair target includes a panel including a core having a honeycomb structure and an outer skin supported by the core.

Although the outer skin and the core are damaged and defected, the damaged portion is repaired by only bonding the repairing patch to the surroundings of the damaged portion of the outer skin without repairing the core in some cases. In this case, if the damaged portion of the core is left as a cavity, the repairing patch is not supported by the core; therefore, the repairing patch should secure a high out-of-plane stiffness alone.

As described above, the present invention using the plurality of repairing plates in the repairing patch can secure the out-of-plane stiffness, so that a panel including a core having a honeycomb structure and an outer skin is suitable as the repair target of the present invention.

In the repair method of the present invention, a step of determining each plate thickness of the plurality of repairing plates, or a number of the repairing plates may be performed. It is preferable that the configuration of the repairing plates is determined through this step.

In the repair method of the present invention, it is preferable that, in the laminating step, the plurality of repairing plates and a plurality of adhesive materials are laminated on top of one another.

In the repair method of the present invention, the method may further include a step of disposing a laminated-body on the repair target, the laminated-body formed in the laminating step, so as to cover the repair target portion.

In the repair method of the present invention, it is also preferable that, in the bonding step, the plurality of repairing plates are bonded to the repair target by heating while the plurality of repairing plates are bonded to one another.

In the repair method of the present invention, the method may further include a step of performing a vacuum evacuation prior to the bonding step, vacuum evacuating the inside of a film after the plurality of repairing plates that covers the repair target portion is covered by the film.

The present invention may be developed to a repaired product obtained from repairing.

A repaired product of the present invention includes a repairing patch that covers a repair target portion, and is bonded to surroundings of the repair target portion, the repairing patch includes a plurality of repairing plates that are formed of fibers and resin, and pre-cured before repairing, and the plurality of repairing plates are laminated and bonded to one another.

According to the present invention, it is possible to attain the same operational advantages as those in the aforementioned repair method.

In the repaired product of the present invention, it is preferable that, on one of the repairing plates, another of the repairing plates having a greater size than that repairing plate is laminated.

Through this configuration, since the one of the repairing plates is entirely covered with another of the repairing plates, it is possible to protect the one of the repairing plates from being peeled off from the repair target.

The present invention is preferably applicable to repairing of a member included in an aircraft. A member included in an aircraft repaired based on the present invention includes a repairing patch that covers a repair target portion formed in the member, and is bonded to surroundings of the repair target portion, the repairing patch including a plurality of repairing plates that are formed of fibers and resin, and pre-cured before repairing, and the plurality of repairing plates being laminated and bonded to one another. In the present invention, the member may include an outer panel of an aircraft.

According to the present invention, it is possible to securely bond the repairing patch to the repair target while ensuring the out-of-plane stiffness by using the pre-cured repairing patch.

DETAILED DESCRIPTION OF THE PREFERRED EMBODIMENTS

An embodiment of the present invention will be described with reference to accompanying drawings, hereinafter.

First, a configuration of a repaired product 1 obtained from repairing will be described, and then a repair method will be described.

Figure 1:
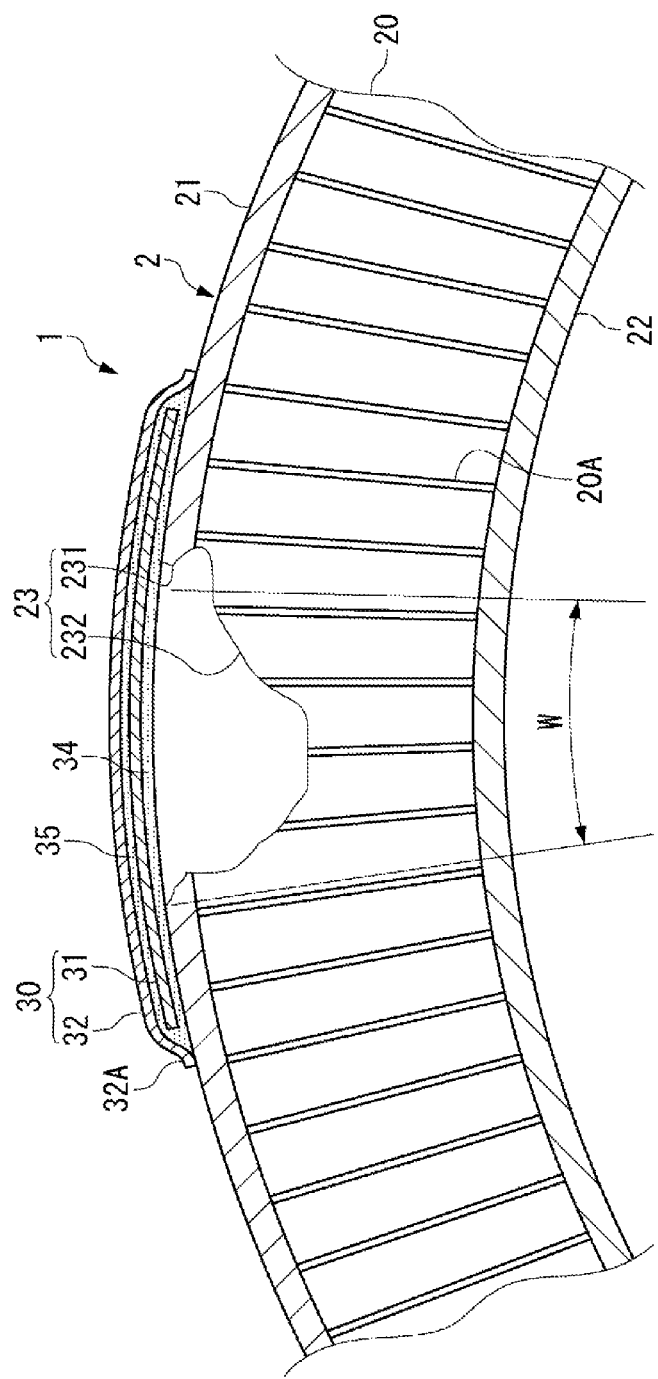
FIG. 1 is a cross sectional view schematically showing a repaired outer panel according to an embodiment of the present invention.

The repaired product 1 shown in FIG. 1 is a product obtained from the repairing of an outer panel 2 constituting an outer surface of a wing of an aircraft.

Although not shown in drawings, the outer panel 2 is respectively disposed on upper and lower sides of the wing with a distance therebetween, and the outer panel 2 along with spars that form a front edge and a rear edge of the wing are assembled in a box shape.

This outer panel 2 has such a structure that holds a core (core member) 20 having a honeycomb structure between two outer skins 21, 22 (honeycomb core sandwich panel), and is formed in a curved surface shape.

The outer panel 2 may constitute the outer surface of a fuselage of the aircraft.

The core 20 includes bulkheads 20A that partitions a space between the outer skin 21 and the outer skin 22 oppositely disposed to each other into a number of cells each having a hexagon cross section. The core 20 is formed of a composite material, or a metallic material, etc.

The outer skins 21, 22 are also formed of a composite material, or a metallic material, and are bonded to end surfaces of the core 20. These outer skins 21, 22 may be thin because they are supported by the core 20 having a high rigidity.

The outer panel 2 may be damaged by receiving impact of a lightning strike or a hailstorm. Consequently, a repair target portion 23 needed to be repaired is formed in the outer panel 2 (repair target).

In the outer panel 2 having a structure that sandwiches the core 20 having a honeycomb structure between the outer skins 21, 22, the outer skin 21 having a thin thickness, and forming the outer surface is prone to be damaged. Hence, a flying object, such as a hailstone, may penetrate through the outer skin 21, and put a dent in the core 20. At this time, as shown in the drawing, the repair target portion 23 includes an outer skin damage hole 231 that penetrates through the outer skin 21 in the plate thickness direction, and a core damage recess 232 continued to the outer skin damage hole 231.

In the present embodiment, as described later, the repair target portion 23 is covered with a plate-like repairing patch 30 formed of a composite material, and the repairing patch 30 is bonded to the outer skin 21 around the repair target portion 23.

In the present embodiment, the core damage recess 232 is filled with nothing, and the outer skin damage hole 231 is covered with the repairing patch 30; thus the core damage recess 232 is left as a cavity. Hence, the repairing patch 30 is required to have a greater out-of-plane stiffness than that of the outer skin 21 that is not supported by the core 20.

The surroundings of the outer skin damage hole 231 preferably have a surface treated to be suitable for being bonded to the repairing patch 30 through sanding and rinse.

The core damage recess 232 may be filled with a material for repairing.

The repairing patch 30 includes a first repairing plate 31 and a second repairing plate 32 that are separated from each other in the plate thickness direction.

The first repairing plate 31 and the second repairing plate 32 are both configured to be circular (see FIG. 2A), and to be laminated and bonded to each other into an integral member.

Each of the first repairing plate 31 and the second repairing plate 32 is produced by laminating carbon fibers formed in a sheet form, impregnating a thermosetting resin, such as an epoxy resin, and a polyimide resin, in the laminated material, and heating this thermosetting resin to be cured. The first repairing plate 31 and the second repairing plate 32 are formed of a precured patch that is cured in advance before the repairing.

Glass fibers may be used in the repairing patch 30, instead of carbon fibers, and any kind of fibers may be used. Instead of the thermosetting resin, a thermoplastic resin which becomes solidified through heating, such as nylon, polyethylene, polystyrene, and polyvinyl chloride, may also be used, and any kind of resin may be used. In the case of using the thermoplastic resin in the repairing patch, such a thermoplastic resin that is melted by heating in advance and is in a solidified state is used. This repairing patch has the same effect as that of the pre-cured repairing patch; therefore this repairing patch may also be included in the repairing patch of the present invention.

Now, a comparison of the out-of-plane stiffness is carried out between a single-piece precured patch formed using the same CFRP as that of the first repairing plate 31 and the second repairing plate 32, and each of the first repairing plate 31 and the second repairing plate 32. It is assumed that the above precured patch has a plate thickness equal to the sum of the plate thickness of the first repairing plate 31 and the second repairing plate 32.

Since the second moment of area is proportional to the cube of a plate thickness, if it is assumed that the plate thickness of the first repairing plate 31 is equal to ½ of the plate thickness of the single-piece precured patch, the second moment of area acting upon the first repairing plate 31 is ⅛. Specifically, compared to the single-piece precured patch, both the first repairing plate 31 and the second repairing plate 32 have a smaller out-of-plane stiffness, and are more flexible, respectively.

Accordingly, before the first repairing plate 31 and the second repairing plate 32 are bonded to each other, the repairing patch 30 can be easily curved along the curved surface of the outer skin 21. After the first repairing plate 31 and the second repairing plate 32 are laminated and integrally bonded to each other, the repairing patch 30 has an out-of-plane stiffness corresponding to the total plate thickness thereof.

To be specific, in the present embodiment, the repairing patch 30 is divided into the plurality of thin repairing plates 31, 32 in the plate thickness direction so that the repairing patch 30 is curved along (or, follows) the surface of the outer panel 2, and the repairing plates 31, 32 are laminated, and integrally bonded to each other, thereby attaining an out-of-plane stiffness necessary for the repairing patch 30.

Each of the first repairing plate 31 and the second repairing plate 32 is configured to have a plate thickness capable of following even a portion at the maximum curvature in the surface of the outer skin 21.

In the present embodiment, both the first repairing plate 31 and the second repairing plate 32 have an equivalent plate thickness, but they may have a different plate thickness from each other.

Figure 2B:
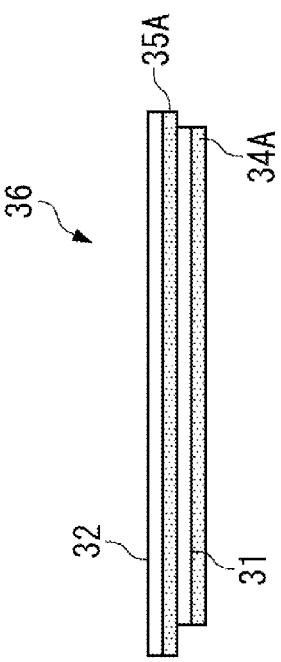
FIG. 2B is a drawing showing the pre-cured repairing plates, and the adhesive films.
Figure 2A:
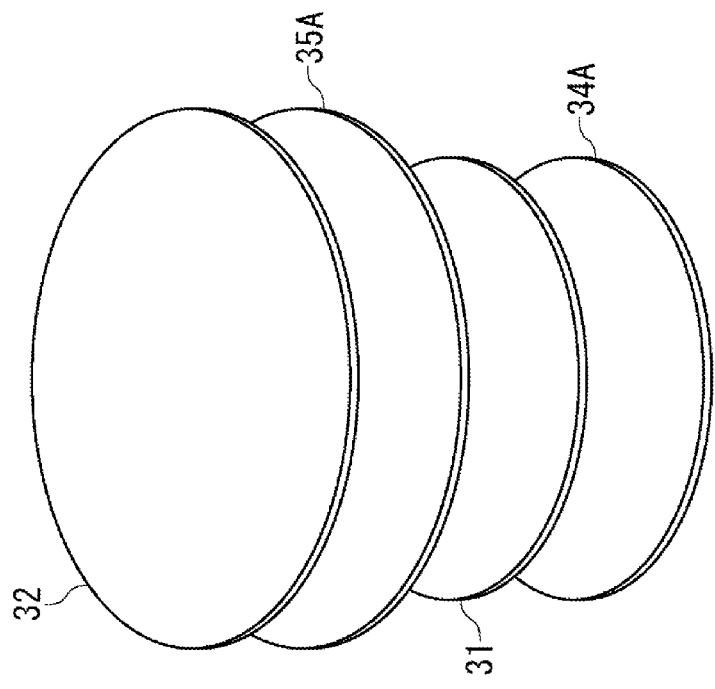
FIG. 2A is a drawing showing pre-cured repairing plates, and adhesive films.

As shown in FIG. 2A and FIG. 2B, the first repairing plate 31 and the second repairing plate 32 are different in diameter from each other.

The first repairing plate 31 has an enough diameter to cover the outer skin damage hole 231.

The second repairing plate 32 has a greater diameter than that of the first repairing plate 31, and is disposed such that its plane center is aligned with the plate center of the first repairing plate 31.

The first repairing plate 31 and the second repairing plate 32 are laminated along with an adhesive film 34A and an adhesive film 35A.

The adhesive film 34A and the adhesive film 35A are produced by forming the thermosetting adhesive into a circular film form, and the adhesive film 34A has a diameter equivalent to that of the first repairing plate 31, and the adhesive film 35A has a diameter equivalent to that of the second repairing plate 32.

The adhesive film 34A may be formed in an annular shape along the surroundings of the repair target portion 23.

An adhesive layer 34 formed by heating and curing the adhesive film 34A is disposed between the outer skin 21 and the first repairing plate 31.

An adhesive layer 35 formed by heating and curing the adhesive film 35A is disposed between the first repairing plate 31 and the second repairing plate 32.

The outer skin 21, the first repairing plate 31, and the second repairing plate 32 are integrated by bonding them to one another through the adhesive layer 34 and the adhesive layer 35.

Figure 3:
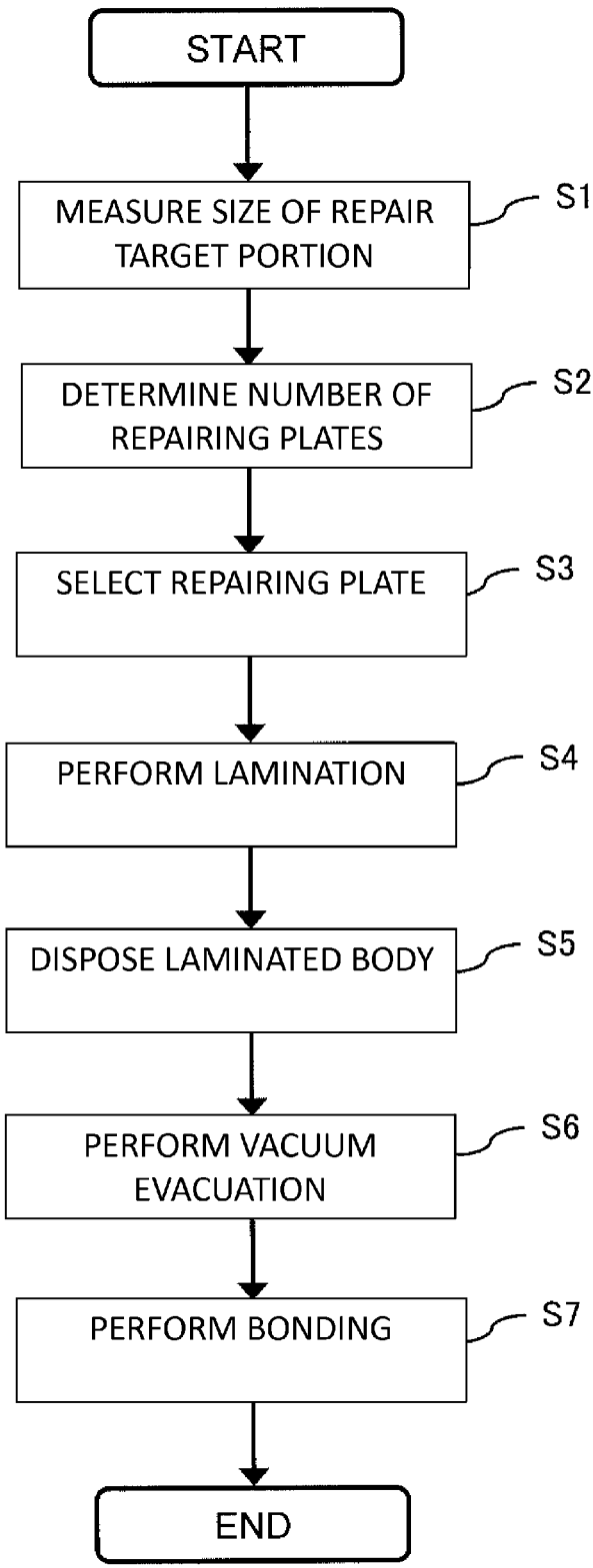
FIG. 3 is a drawing showing an example of a procedure of repairing.

An example of the repairing procedure of the repair target portion 23 will be described with reference to FIG. 3, hereinafter.

A plurality of repairing plates are prepared before the repairing. These repairing plates have the same plate thickness with different diameters. Only the required number of repairing plates having a corresponding size to the size of the repair target portion 23 is selected among these repairing plates.

First, a size W of the repair target portion 23 (FIG. 1) is measured (repair-target-portion size measurement step S1). At this time, measurement is carried out at the maximum width (distance) of the outer skin damage hole 231 along the curved surface of the outer skin 21.

A plate thickness required for the repairing patch 30 is determined based on the out-of-plane stiffness necessary in the repairing patch 30, and the number of the repairing plates into which this required plate thickness is divided is determined by the required plate thickness (number of repairing plates determining step S2).

For example, if it is assumed that the repairing patch 30 requires a plate thickness of 0.4 mm based on the out-of-plane stiffness necessary in the repairing patch 30, and each plate thickness of the prepared repairing plates is 0.2 mm, the number of the repairing plates is two.

In this step S2, the out-of-plane stiffness may be acquired by calculation, or based on the table data indicating correspondence between each portion and the out-of-plane stiffness. The plate thickness required for the repairing patch 30 may also be acquired by calculation, or based on the table data indicating correspondence between the out-of-plane stiffness and each plate thickness.

Step S2 may be carried out along with step S1, or carried out prior to step S1.

Subsequently, only the necessary number of the repairing plates each having a diameter corresponding to the measured size W of the repair target portion 23 are selected among the prepared repairing plates (repairing-plate selecting step S3).

At this time, a repairing plate having a greater diameter than the size W is selected as the first repairing plate 31, and a repairing plate having a greater diameter than the diameter of the first repairing plate 31 is selected as the second repairing plate 32.

The first repairing plate 31 and the second repairing plate 32 included in the repairing patch 30 are selected in this manner.

Then, as shown in FIG. 2B, the adhesive film 34A, the first repairing plate 31, the adhesive film 35A, and the second repairing plate 32 are laminated in this order (laminating step S4). A laminated body 36 is formed by the first and second repairing plates 31, 32, and the adhesive films 34A, 35A.

Subsequently, the laminated body 36 is disposed on the surface of the outer panel 2 (surface of the outer skin 21) so as to cover the repair target portion 23 (laminated-body disposing step S5).

At this time, the adhesive films 34A and 35A are not yet cured, and the first repairing plate 31 and the second repairing plate 32 are not constrained by each other, so that the laminated body 36 has flexibility overall. Hence, the laminated body 36 is easily curved conforming to the surface of the outer panel 2.

Instead of laminating the adhesive film 34A, the first repairing plate 31, the adhesive film 35A, and the second repairing plate 32 into the laminated body 36 at a location away from the outer panel 2, and then disposing the laminated body 36 on the outer panel 2, the laminated body 36 may also be formed on the outer panel 2 by laminating the adhesive film 34A, the first repairing plate 31, the adhesive film 35A, and the second repairing plate 32 in turn on the surface of the outer panel 2.

Figure 4:
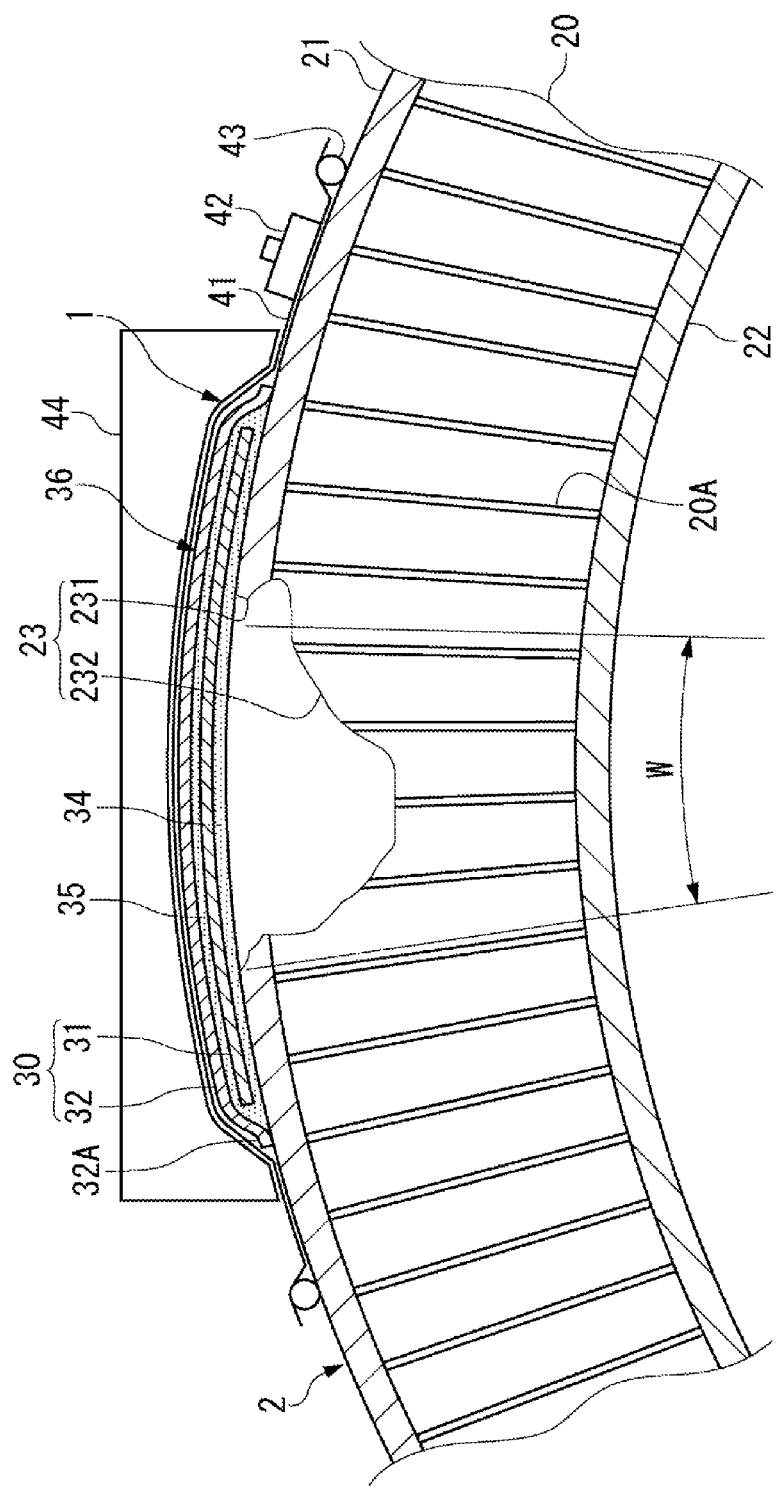
FIG. 4 is a drawing showing a bonding step of curing an adhesive by heating.

As shown in FIG. 4, the laminated body 36 and the repair target portion 23 are covered with a heat-resistant film 41, and a clearance between the film 41 and the surface of the outer panel 2 is sealed with a sealant tape 43 annularly disposed around the repair target portion 23. Vacuum evacuation is then carried out through a valve 42 disposed in the film 41 (vacuum evacuating step S6).

Because of a difference in pressure of the atmosphere between the inside and the outside of the film 41 that is depressurized by the vacuum evacuation, the laminated body 36 can be pressed against the surface of the outer panel 2.

A heater mat 44 incorporating a heater is placed on the laminated body 36 through the top of the film 41, thereby heating the laminated body 36 to cure the adhesive films 34A, 35A (bonding step S7). The vacuum evacuation is preferably maintained even in this step S7. As a means of curing the adhesive films 34A, 35A by heating, a heat gun blowing hot air, or an oven capable of housing the outer panel 2 therein may be used.

When the adhesive films 34A, 35A are cured, they turn into the adhesive layers 34, 35. At this time, because of a uniform force caused by the difference in pressure that acts on the laminated body 36, the adhesive layers 34, 35 with a uniform thickness are formed respectively between the outer panel 2 and the first repairing plate 31, and between the first repairing plate 31 and the second repairing plate 32.

The outer periphery of the second repairing plate 32 having a greater diameter than that of the first repairing plate 31 is pressed against the surface of the outer panel 2 due to the difference in pressure of the atmosphere between the inside and the outside of the film 41. Hence, the plane surface and the side surface of the first repairing plate 31 are entirely covered with the second repairing plate 32, thereby protecting the first repairing plate 31 from being peeled off from the outer panel 2.

The repairing of the outer panel 2 is completed in this manner.

According to the present embodiment described above, the repairing patch 30 has a small out-of-plane stiffness until the repairing plates 31, 32 are bonded to each other, and thus the repairing patch 30 can follow the curved surface of the outer panel 2. Accordingly, the repairing patch 30 can be securely bonded to the outer panel 2 with a sufficient bonding strength. Meanwhile, through integral bonding between the first repairing plate 31 and the second repairing plate 32, the repairing patch 30 is provided with an out-of-plane stiffness corresponding to the total plate thickness thereof.

According to the present embodiment, it is possible to securely repair the repair target portion 23 of the outer panel 2 while ensuring the out-of-plane stiffness required in the repairing patch 30.

The repairing patch 30 of the present embodiment can be easily curved in the out-of-plane direction before the first repairing plate 31 and the second repairing plate 32 are bonded to each other; therefore, it is possible to repair any shape of the outer panel 2 around the repair target portion 23.

Figure 5:
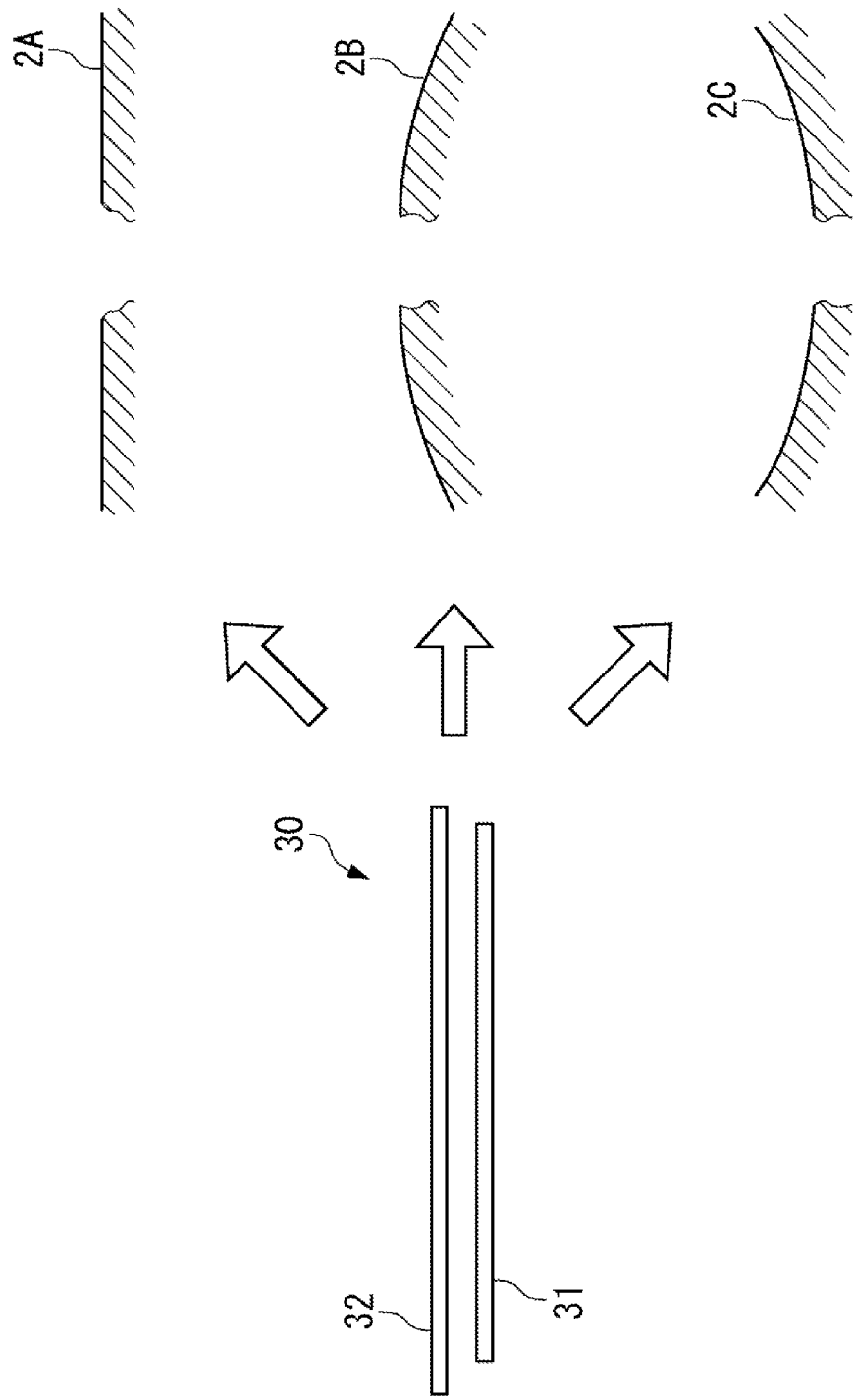
FIG. 5 is a drawing showing that a repairing patch of the present embodiment is applicable to repair targets having various shapes.
Figure 6:
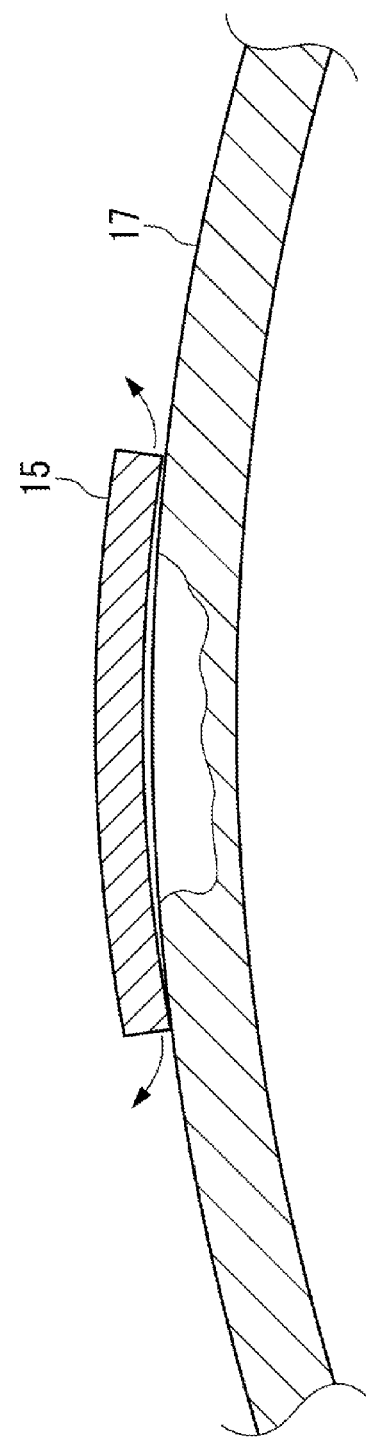
FIG. 6 is a drawing showing an example of a prior art.

As shown in FIG. 5, the repairing patch 30 including the first repairing plate 31 and the second repairing plate 32 may be applicable to repairing of not only a planar member surface 2A, but also a convex member surface 2B and a concave member surface 2C.

In addition, by changing the number of repairing plates, the repairing patch 30 may be applicable to repairing of multiple different portions requiring different out-of-plane stiffness. For example, by adding a third repairing plate to the first and second repairing plates 31, 32, the repairing patch 30 may be applicable to a portion to be repaired where a greater out-of-plane stiffness is required.

If such a precured patch is produced that has a shape conforming to the curved surface of the outer panel 2 and a plate thickness corresponding to a certain out-of-plane stiffness, it takes a long time to design and produce this precured patch, and it also requires a complicated work for accurately disposing the precured patch in accordance with the curved shape. It also incurs high cost to prepare many precured patches having various shapes corresponding to the various portions of the outer panel 2 based on the strength examination at these various portions.

In the present embodiment, however, because the repairing patch is flexible until the first and second repairing plates 31, 32 are bonded to each other, the repairing patch 30 can be formed in conformity with the surface of the outer panel 2 regardless of the shape of the outer panel 2. Specifically, only the required number of the repairing plates 31, 32 are selected from the prepared repairing plates, and laminated and bonded to each other, thereby quickly and smoothly carrying out the repairing.

It is possible to combine a plurality of repairing plates so as to satisfy the out-of-plane stiffness required in the repairing patch 30 depending on the portion, thereby realizing a general use of the repairing material, which resulting in cost reduction.

The repairing procedure described above is merely an example thereof, and there are various repairing procedures.

In the above example, the number of the repairing plates 31, 32 used in the repairing patch 30 is determined based on the out-of-plane stiffness necessary in the repairing patch 30. However, each plate thickness of the repairing plates 31, 32 may be determined based on the out-of-plane stiffness necessary in the repairing patch 30.

Before the first and second repairing plates 31, 32 are disposed on the outer panel 2, they may be bonded to each other in advance while they are curved in conformity with the surface of a model of the outer panel 2. In this case, the first repairing plate 31 and the second repairing plate 32 that are already integrally bonded to each other are bonded to the outer panel 2.

In the present embodiment, the outer panel 2 of a honeycomb core sandwich panel is treated as the repair target, however, an outer panel formed of a composite material across its entire thickness, or even a metallic outer panel may also be repaired using the repairing patch 30 in the same manner as aforementioned.

It is possible to repair not only the outer panel, but also wall materials, floor materials, ceiling materials, and doors of an aircraft in the same manner as aforementioned.

The present embodiment may also be applicable to repairing of other structural components and accessories of an aircraft.

Other than the above description, the configurations described in the aforementioned embodiment may be selected, or appropriately changed to other configurations without departing from the spirit and scope of the present invention.

The repairing patch used in the present invention may be configured in any form as far as the repairing patch includes a plurality of pre-cured repairing plates that are laminated and bonded to one another. The plane shape of the repairing patch is not limited to a circular shape, and may be formed in an oval shape or a rectangular shape.

In addition, a repairing patch including a plurality of repairing plates made of a metallic material, such as an aluminum alloy and a titanium alloy, may be used as the repairing patch of the present invention.

Each plate thickness of the plurality of repairing plates is determined depending on the curvature of the repair target and desired flexibility. The repairing plate is unnecessary to be pliable (flexible) enough to perfectly follow the surface shape of the repair target. Because the plate thickness of each of the repairing plates is smaller than that of the repairing patch, a peel-off force of peeling off the repairing plates from the repair target, which acts upon the plurality of thin repairing plates, is also smaller. Thus, it is possible to bond the repairing plates to the repair target with sufficient bonding strength.

The adhesive for bonding the repairing plates to one another, and the adhesive for bonding the repairing plates to the repair target may have any form and conditions as far as they work as adhesive. The adhesive films 34A, 35A may be formed of a thermoplastic adhesive made of a thermoplastic resin, such as nylon, polyethylene, polystyrene, and polyvinyl chloride. In this case, while the thermoplastic resin does not yet exert its binding force, the first repairing plate 31 and the second repairing plate 32 are not constrained by each other, so that the laminated body 36 has flexibility overall, and the laminated body 36 is easily curved in conformity with the surface of the outer panel 2. Accordingly, it is possible to attain the same operational effect as that of the aforementioned embodiment.

In addition, the present invention may be applicable to any repair target other than members included in an aircraft, such as blades of a windmill, and also applicable to repairing of various objects damaged by impact, high temperature, abrasion, and corrosion, etc.

The repair target of the present invention is not limited to a plate-like one. The present invention may be widely applicable to repairing that bonds the repairing patch to an outer periphery or an outer shell of an object in any form. Even if the repair target has a complicated form, it is possible to securely bond the repairing patch along the surroundings of the repair target portion because the repairing patch is flexible enough to be curved in the out-of-plane direction with a smaller force until the repairing plates are bonded to one another, compared to the case of using the repairing patch after being integrally formed through bonding.

What is claimed is:

1. A repair method of a repair target portion, in which the repair target portion formed in a repair target is covered with a repairing patch, and the repairing patch is bonded to the repair target, the repair method using a plurality of repair plates that are formed of fibers and resin, and pre-cured before repairing as the repairing patch, and comprising:

a laminating step of laminating the plurality of repairing plates and an adhesive material to form the repairing patch;

a covering step of covering the repair target with the repairing patch while the adhesive material is not yet cured; and a bonding step of bonding the plurality of repairing plates, laminated in the laminating step, to one another.

2. The repair method of a repair target portion according to claim 1, wherein in the laminating step, on one of the repairing plates, another of the repairing plates having a greater size than that repairing plate is laminated.

3. The repair method of a repair target portion according to claim 2, wherein the repair target includes a panel including a core having a honeycomb structure and an outer skin supported by the core.

4. The repair method of a repair target portion according to claim 1, further comprising a step of determining each plate thickness of the plurality of repairing plates, or a number of the repairing plates.

5. The repair method of a repair target portion according to claim 1, wherein in the laminating step, the plurality of repairing plates and a plurality of adhesive materials are laminated on top of one another.

6. The repair method of a repair target portion according to claim 1, further comprising a step of disposing a laminated-body on the repair target, the laminated-body formed in the laminating step, so as to cover the repair target portion.

7. The repair method of a repair target portion according to claim 1, wherein in the bonding step, the plurality of repairing plates are bonded to the repair target by heating while the plurality of repairing plates are bonded to one another.

8. The repair method of a repair target portion according to claim 1, further comprising a step of performing a vacuum evacuation prior to the bonding step, vacuum evacuating the inside of a film after the plurality of repairing plates covering the repair target portion is covered by the film.

9. The repair method of a repair target portion according to claim 1, wherein the plurality of repair plates are pre-cured before the laminating step of laminating the plurality of repairing plates.

10. The repair method of a repair target portion according to claim 1, wherein in the laminating step, the plurality of repairing plates and a plurality of adhesive films are laminated on top of one another.

11. A repaired product comprising the repair target portion repaired according to the repair method of claim 1, wherein the repairing patch is bonded to surroundings of the repair target portion, the repairing patch including the plurality of repair plates that are formed of fibers and resin, and pre-cured before repairing, and the plurality of repairing plates being laminated and bonded to one another.

12. The repaired product according to claim 11, wherein on one of the repair plates, another of the repair plates having a greater size than said one repair plate is laminated.

13. A member included in an aircraft comprising the repair target portion repaired according to the repair method of claim 1, the repair target portion being formed in the member and the repair patch being bonded to surroundings of the repair target portion, the repairing patch including the plurality of repair plates that are formed of fibers and resin, and pre-cured before repairing, and the plurality of repair plates being laminated and bonded to one another.

14. The member included in an aircraft according to claim 13, wherein the member includes an outer panel.

15. A repair method of a repair target portion, in which the repair target portion formed in a repair target is covered with a repairing patch, and the repairing patch is bonded to the repair target, the repair method using a plurality of repair plates that are formed of fibers and resin, and pre-cured before repairing as the repairing patch, and comprising:

a laminating step of laminating the plurality of repairing plates; and a bonding step of bonding the plurality of repairing plates, laminated in the laminating step, to one another, wherein the repair target includes a panel including a core having a honeycomb structure and an outer skin supported by the core.

* * * * *